FIG. I.

United States Patent Office 3,121,698
Patented Feb. 18, 1964

3,121,698
PROCESS OF COATING CELLULOSIC PARTICLES BY POLYMERIZING A 1-OLEFIN ONTO SAID PARTICLES; PROCESS OF REMOVING THE CELLULOSIC PARTICLES FROM THE COATED PARTICLES AND HOLLOW SHELLS OBTAINED THEREFROM
Joseph A. Orsino, Mountain Lakes, and Daniel F. Herman, Orange, N.J., and Jack J. Brancato, New Hyde Park, N.Y., assignors to National Lead Company, New York, N.Y., a corporation of New Jersey
Filed Nov. 13, 1959, Ser. No. 852,844
31 Claims. (Cl. 260—2.5)

This invention relates to a process of polymerizing olefinic materials directly on the surfaces of cellulosic materials, to the products obtained thereby, to processes of forming useful articles from such products and to the products resulting from such forming operations.

More particularly, this invention is concerned with a simple, inexpensive process of forming a polyolefin such as polyethylene, polypropylene, polyisoprene, or the like, directly on particles, fibers or filaments of cellulosic material so that each individual cellulosic particle, fiber or filament is substantially encased in a shell of the polyolefin that is chemically or physically bonded thereto, or both. The invention is concerned also with a variety of novel products that can be made with polyolefin coated cellulosic materials thus prepared.

This application is a continuation-in-part of our application Serial No. 714,569, filed February 11, 1958, and now abandoned.

Many procedures have been proposed heretofore for coating, impregnating or otherwise treating cellulosic products such as wood, paper and various textiles with the object of modifying or altering the properties of these materials to make them more water resistant, more flame resistant, more resistant to chemicals, stronger, etc. For example, various kinds of wood, paper and cloth have been impregnated with many different oils, waxes or resins to make the cellulosic material more waterproof. Such impregnated products have disadvantages inherent in their manner of manufacture. In many cases, as with waxed paper, the impregnating material is easily removed by heat, solvents or the like. In other cases, the impregnated paper, wood or cloth frequently is made more brittle and cannot withstand flexing without causing the impregnant to crack or peel, or causing the product to crack or break.

Impregnation or coating, whether carried out by spraying, dipping or other techniques, can also be difficult and costly to perform since solvents are usually required and have to be evaporated or otherwise removed after the impregnation. In addition, such impregnation or coating is not uniform throughout the product. A substantial portion of the coating or impregnate remains on the surface of the product and the penetration of the coating or impregnate into the interior of the product varies due to differences in surface tension effects. Also, much of the impregnant or coating is wasted by more or less filling all of the pore spaces and other interstices in the base material.

One of the objects of this invention is to provide a process whereby small particles, fibers or filaments of cellulosic material may be easily and inexpensively encased individually in tubes, sleeves or shells of a polyolefin plastic anchored secured to the cellulosic material. This permits much more efficient use of the polymer and also makes new kinds of physical structures easy to fabricate.

Another object of our invention is to produce a product consisting of small particles, fibers or filaments of cellulosic material substantially encased in sleeves, tubes or shells of polyolefin plastic, which product is relatively free flowing but can very easily be cast, extruded, molded or otherwise formed into sheets, films, tubes or articles having a wide variety of shapes and capable of many different uses and applications.

Another object of the invention is to form cast, molded or extruded objects varying widely in density and porosity and useful for such purposes as semi-permeable membranes, gas or liquid filters, heat or sound insulating material, containers for hot or cold liquids, water-proof fabrics and many others depending only upon how the articles are fabricated.

Still another object of this invention is the provision of small sleeves, tubes or shells of a polyolefin plastic, such as polyethylene or polypropylene, which are extremely small in size and which, although formed initially about individual fibers of cellulosic material, are partially or entirely hollow because the cellulosic material has, subsequently, been more or less removed from inside the sleeves or tubes after they are formed and without disturbing their size, shape, structure or composition.

The invention may be better understood by reference to the accompanying drawings, in which:

FIG. 1 is a representation of a photomicrograph at a magnification of about 800 diameters of short fibers of untreated sulfite paper pulp. These fibers are about 500 microns in length and about 20 to 30 microns in diameter.

Figure 1:

The process of encasing individual particles, fibers or filaments of cellulosic material in tubes, sleeves or shells of polyolefin plastic polymerized in situ is preferably carried out by the use of what is known as an organo-metallic-transition metal catalyst system. The components of such a catalyst system, as will be understood by those skilled in the polymer art, react when mixed together to produce a substance or substances highly active as a polymerization initiator for the low molecular weight aliphatic 1-olefins.

Any of the aliphatic 1-olefins having less than 6 carbon atoms may be polymerized in accordance with our invention. These include the simplest 1-olefins such as ethylene, propylene, butene-1 and the like and also di-olefins such as butadiene-1,3 and isoprene. These 1-olefins may be used to form homopolymers, or mixtures of them may be polymerized together to form various copolymers. In addition, other compounds which are known to copolymerize with these 1-olefins to form useful products may be employed in combination therewith.

For most purposes we prefer to use ethylene or propylene which have the outstanding advantages of being gases at ordinary temperatures, of being relatively inexpensive and available in large quantities, and of producing polymers of high molecular weight having very desirable properties.

We have found that it is important in our process to treat the cellulosic material with one of the components of the catalyst system before the components have been mixed together long enough to complete their reaction with each other. Some reaction appears to take place between this catalyst component and the cellulosic material, probably a reaction involving either the active hydroxyl groups or the ether type linkages of the latter. Usually, the other component of the catalyst system is then added and the treated cellulosic material is brought into contact with the olefin under proper conditions to form the polymer directly on the cellulosic material surfaces. By this procedure, active catalyst sites are formed on the cellulose surfaces so that the polymer chains grow on and from these sites as the polymerization reaction proceeds. The use of too large a proportion of catalyst in excess of the amount that can be taken up by the cellulosic material produces a different kind of product and should be avoided.

We have found that if the catalyst components are mixed together for a sufficient time (for example, 5 minutes) and then added to the cellulosic material, the polymer that is formed is of a heterogeneous character and most or all of the polymer is in the form of separate pieces which can be readily separated from the cellulosic material by flotation techniques. On the other hand, we have discovered that if the cellulosic material is treated with any one of the catalyst components before this component is fully reacted with the other catalyst component, the polymerization takes place at and on the surface of the cellulosic material building up a shell of any desired thickness on the cellulosic material. When finely divided particles of cellulose fibers are thus treated, the particles carrying the polymer shells remain separate and discrete, and substantially no polymer appears to form either inside the cellulose fibers or as independent pieces of polymer. It is particularly surprising that this result can be obtained because active hydroxyl groups, such as occur in cellulose, are generally regarded as poisons for catalysts of the type employed.

One simple and convenient way of carrying out this treatment is by the slurry method in which the cellulosic material is suspended in a suitable liquid medium such as an organic liquid that does not dissolve or react with either cellulose or the polymer to be formed. The cellulosic material may be treated with one of the catalyst components before or after it is placed in the suspending liquid. The other catalyst component is then brought into contact with the cellulose, or the two catalyst components may even be added to the suspending liquid simultaneously with the cellulosic material. The slurry of catalyst treated cellulosic material in the organic liquid, after the second component of the catalyst has been added, is placed in a closed reaction vessel and the monomer is fed into the vessel at a suitable rate while maintaining the slurry under agitation. Provisions should be made to control the temperature of the reaction vessel, and the reaction should be carried out under reasonably anhydrous conditions. As polymerization proceeds, the slurry becomes thicker and reaction is stopped at any desired stage depending upon how much of the polymer is to be formed. The slurry can then be removed from the reaction vessel and simply pressed or filtered to remove the free organic liquid and then washed in water, methanol or other materials which easily dissolve out the bulk of the catalyst residue.

When properly carried out, this process may be applied to a variety of different cellulosic materials, including not only natural cellulose such as wood, wood fibers, sawdust, wood-flour, various kinds of paper pulp, bagasse, cotton, in the form of batting, linters or filaments, line, hemp and the like, but also regenerated cellulose such as viscose, cuprammonium or cellulose acetate rayons and cellulose compounds such as cellulose acetate and the like.

Catalyst systems which are useful in the process of this invention include any two or more component systems which, when mixed together, react to form a material that initiates the polymerization of the 1-olefins, and which have at least one component that reacts with or becomes fixed in some way on cellulosic materials when brought in contact therewith. In general, we have found that two component systems which are particularly suitable are those in which one component is an organometallic reagent such as an alkyl or aryl of one of the metals lithium, sodium, potassium, magnesium, calcium, zinc, cadmium, boron, or aluminum, and the other component is a transition metal compound such as a halide or ester of titanium, zirconium, vanadium or chromium. Other similar catalyst systems can be used as will be apparent to those skilled in the art of producing polyolefins.

As will also be evident to those skilled in polymer chemistry, it is important when using one of the catalyst systems noted above to conduct the polymerization under substantially oxygen free and anhydrous conditions since the activity of the catalyst system is impaired by the presence of any substantial amount of oxygen or water. We have found, however, that more water than usual can be tolerated in the system when treating cellulosic materials according to our invention. A small fraction of 1% of moisture retained within the cellulose does not appear to interfere with the reaction and may in fact have a beneficial effect.

The polymerization reaction may be carried out at atmospheric pressure, or higher pressures if desired, and over a wide range of temperature. Ordinarily, the polymerization proceeds rapidly at atmospheric pressure and at a temperature between about 20° C. and about 100° C. The amount of polymer formed will vary with the time of the polymerization reaction, the particular catalyst used and the particular monomer or monomers being polymerized. Useful products are obtained by forming a total amount of polymer on the cellulose amounting to anywhere from around 1% of the weight of the cellulose up to amounts of polymer greater than the weight of the cellulose. In order to form self-sustaining polymer shells after the cellulose is dissolved, the product should contain at least about 5 to 6% of polymer. Usually a polymerization reaction time of about one-half to twelve hours suffices to produce the most desirable products containing about 5 to 75% of polymer by weight, although shorter or longer times may be employed.

Cellulose may be treated in the form of fine powder as small as 5 microns or smaller in size, in the form of fibers ranging generally from 30 microns to 7,000 or 8,000 microns in length and around 7 to 55 microns in diameter, or in the form of filaments of the type used in textiles. One of the distinctive features of the products obtained by this process is that the individual particles, fibers or filaments can be substantially encased in individual shells of the polymer without appreciable agglomeration of the particles or fibers during the polymerization. The tubes or sleeves of polyolefin which encase the particles or fibers may range anywhere up to 10 microns or more in wall thickness without sticking the particles together. Thus, at the end of the polymerization reaction, the product is still composed of particles or fibers of about the original size, but which are very free flowing. Coated fibers of paper pulp or the like can be handled after the polymerization reaction using the same kind of techniques that are employed in the paper making industry. They can be suspended in water and then formed into a self-sustaining web or sheet of the desired thickness on a screen or felt by means of suction applied to the under surface thereof.

In treating some types of long fibers, such as kraft, a tendency of the fibers to break up during treatment has been noted. This breaking up of certain types of long fibers has been particularly noted when such fibers are agitated vigorously with one of the components of the catalyst system, for example, $TiCl_4$. Where, for purposes of tensile strength or the like, it is desired to preserve the integrity of the long fiber, fiber length may be preserved by regulating the agitation, particularly during the initial stages of polymerization, by selecting the catalytic component which is to be first added to the untreated fiber, or by adding the catalytic component in a diluted form. For example, when treating long fibers of kraft in accordance with the invention with $TiCl_4$ and aluminum alkyl, it was found fiber length could be preserved by applying only gentle agitation during initial polymerization, by first treating the fibers with the aluminum alkyl before the addition of $TiCl_4$ or by adding the $TiCl_4$ diluted in dry heptane. In any event, by exercising some degree of care, particularly during the initial stages of polymerization, substantial breaking up of these longer fibers can be avoided.

Figure 2:
FIG. 2 is a representation of a photomicrograph on the same scale of the same kind of paper pulp fibers encased in tubes, sleeves or shells of polyethylene polymerized thereon by the procedure described in Example 1.

The polymer coated cellulose particles are entirely different from any product that can be made by mechanical mixing of cellulose and a pre-formed polymer, as by spraying, dipping, milling or other means of coating cellulose with separately formed polymer. This is evident from the microscopic examination of the coated cellulose particles which reveals, as can be seen in FIG. 2, that the polymer forms directly on and tenaciously adheres to the outer surface of each individual cellulose particle like an integral skin. As the polymerization is continued for longer times to build up higher proportions of the polymer, the skin or shell first formed does not necessarily remain of uniform thickness but the polymer may form rounded bumps, nodules or protuberances on the outer surface of the shells much like the treeing effect obtained when one attempts to deposit thick layers of certain metals by electrodeposition. Even though thick layers or shells of the polymer are built up on the cellulose particles, the polymer on one particle does not appear to join to any appreciable extent with the polymer on another particle during the polymerization reaction. Thus, for all practical purposes, the individual coated cellulosic particles remain as separate and discrete particles without agglomeration.

The polymer coated cellulose particles or fibers of our invention are hydrophobic in character and can be readily cast, molded, extruded or otherwise formed into products of varying porosity which retain this hydrophobic property. On the other hand, if desired, this hydrophobic property is very readily dissipated or changed by adding a fraction of a percent of any suitable wetting agent to the product after polymerization and either prior to or after molding the product into a useful article.

The polymer coated cellulose particles or fibers are free-flowing and can be readily poured into a mold of any shape and may be formed into an article by pressure alone, heat alone, or by a variety of combinations of heat and pressure. The manner by which the article is formed depends, to a great extent, on the properties required in the finished product, the length of the coated particles or fibers, the percentage of polymer on the coated particles or fibers, and the properties inherent in the particular polymer coating. Simple heating without pressure fuses the particles together to form a self-sustaining article. When molded without any substantial pressure, the article is very porous and readily permits the passage of gases and, under proper conditions, of most liquids. Such a product is very light in weight and provides an excellent heat or sound insulating medium. Increasing the temperature or pressure or increasing both the temperature and pressure results in an incease in density and a reduction in porosity. Temperatures as high as or somewhat above the crystalline melting point of the polymer coating may be employed. Where maximum tensile strength in the finished article is of importance, it is preferable to mold the material at a temperature at or slightly above the crystalline melting point of the polymer coating. In the case of cellulose coated with polyethylene, a heating temperature as high as 310° F. or even higher may be employed to attain maximum tensile strength, while with products coated with polypropylene, other polyolefins or copolymers, the temperature of heating may be somewhat higher or lower depending on the crystalline melting point of the polymer coating.

The porosity of such products can be reduced to any desired degree by perfoming the molding operation under the requisite amount of pressure along with the heating of the material to the fusing temperature. On the other hand, the porosity of pressure molded or cast articles can be increased by subjecting the formed article to some liquid, such as strong sulfuric acid solution, which dissolves the cellulose, or most of it, and leaves only the hollow shells of the polyolefin fused together in the cast or molded state. Porous products that are excellent for special filtering operations, such as cigarette filters, can be made from the molding powders of our invention. Some of our products can be made of a porosity which permits the passage of gases but retains liquids.

Relatively porous cast or molded articles of substantially pure polyolefin can also be produced by dissolving out some or all of the cellulose from the molding powder before it is formed into a fused body. In this case the molding powder is composed of a mass of hollow shells or tubes of polymer which are capable of forming cast or molded articles of varying degrees of porosity depending upon the amount of heat and pressure applied during fabrication. Strong sulfuric acid, caustic soda or other substances that are known to dissolve or solubilize cellulose may be used to remove cellulose from the product either before or after molding.

We have found that sheets and molded articles of high density and impervious to the passage of hot or cold liquids can be formed by molding the article or sheet from the polymer coated cellulose particles or fibers at the requisite fusing temperature and under a pressure of the order of 2,000 to 10,000 pounds per square inch. High molding pressures give sheet products of parchment like appearance that are still very flexible. In this way the molding material of our invention may be used to form inexpensive articles such as milk bottles, cups for serving hot coffee and many other purposes.

We have also discovered that the cellulose particles or fibers coated with a polymer in accordance with our invention can be molded under lower pressures, such as 5 to 50 pounds per square inch to form sheet materials that are ideal as a semi-permeable membrane.

In addition, the molding materials of our invention can be used to form laminated structures in which the powder is fused, or pressed and fused, about wire, solid metal or any desired core material to produce a product of the desired porosity. Sheets or other articles made according to our invention can be readily heat sealed to each other or to other heat sealing materials.

Sheet materials made according to our invention, whether highly porous or of greater density, have an unusually soft feel or handle and can be used in various products that are brought into contact with a person's skin. They are so resistant to ordinary acids, alkalies and other materials that they can even be used as pads or the like which are left inside a person's body after a surgical operation. Molded sheets or other articles of this invention can be made all the way from thin, hard dense products to soft flexible sheets, but all such products inherently have the soft waxy feel typical of the polyolefin employed. Considerable variation in the tear strength of these sheet materials can be obtained depending principally upon the length of the fibers used and the amount of pressure used in molding.

Because of the hydrophobic nature of the coated cellulose material made in accordance with our invention, porous sheets can be prepared in which filaments are substantially encased in the sleeves of a polyolefin so that the cloth will shed water even though it has holes or pores readily permitting the passage of water vapor and gases. Such a material is excellent for light weight summer raincoats, laboratory and factory apparel and the like.

Another way in which molding powders made according to our invention may be used is to form them into articles with the aid of a solvent for the polyolefin. The molding powder may be softened or even dissolved more or less by means of solvents for the polyolefin and the softened mass formed into an article of the desired shape with accompanying evaporation of the solvent. The solvent selected and the temperature used will, of course, vary with the polymer. For example, with polyethylene coated products, xylene may be used at a temperature of 100-125° C. or a better solvent such as Decalin may be used at a lower temperature to soften the mass. For most purposes, however, a very wide variety of products can be made by heat alone, pressure alone, or by a combination of heat and pressure, without using any solvent for the polymer.

In order that the invention may be more readily understood, the following examples are given:

Example 1

Twenty-four grams of wood cellulose floc were dispersed in 1400 cc. of toluene under dry conditions. The air in the vessel was replaced with nitrogen and 0.0316 mol of $TiCl_4$ was added to the dispersion. The mixture was allowed to react ½ hour at room temperature to bring about the titanation of the cellulose, after which 0.0712 mol of methylmagnesium bromide was added. The temperature was raised to and maintained at 50–60° C., while a stream of gaseous ethylene was passed into the mixture. The color gradually changed from orange through dark green to almost black. The flow of ethylene was continued for six hours, until the rate of absorption became negligible. The amount of ethylene absorbed was approximately equal in weight to the amount of cellulose floc in the reaction vessel.

The solution was cooled and diluted by adding an equal volume of methanol, and the cooled solution was filtered and washed with additional methanol. The filter cake, after drying, was a white, powdery cellulose-polyethylene composition according to this invention, containing approximately 50% by weight of polyethylene.

The dried powder was formed into a web on a papermaking machine and lightly compressed in a mold heated to about 150° C. As removed from the mold, the product was a porous, self-sustained, sheet.

Example 2

Forty grams of cellulose floc were dispersed in 1400 cc. of toluene. The air in the vessel was displaced with nitrogen, and 0.0158 mol of titanium tetrachloride was added. After allowing ½ hour for the cellulose to become titanated, 0.0474 mol of triisobutylaluminum was added. The temperature was then raised to and maintained at 50–60° C., while ethylene gas was passed into the mixture until absorption of the gas became negligible. The mixture was then cooled and diluted with methanol, filtered, washed and dried as described in Example 1. The product, which was obtained in good yield, was a cellulose-polyethylene composition according to this invention, containing approximately 35% of polyethylene.

On microscopic observation, the product presented the appearance typical of the compositions of this invention as seen in FIG. 2. It was composed of long cellulosic fibers, each fiber encased in a sleeve or tube of polymerized hydrocarbon that appeared to be attached to the fibers. Few, if any of the polymer particles were to be found in the spaces between the cellulose fibers, either on a light microscope or electron microscope examination.

Example 3

Twenty-four grams of cellulose acetate were suspended in 1400 cc. of toluene in a closed vessel, and the air in the vessel was swept out and replaced with nitrogen, after which 0.023 mol of titanium tetrachloride was added. The mixture was allowed to stand for ½ hour to allow titanation to take place, and then 0.055 mol of methylmagnesium bromide was added. The temperature was raised to 50–60° C., and held there while ethylene gas was passed into the solution until no more was absorbed. The mixture was then cooled and diluted with methanol as in the preceding examples, washed and dried.

The product contained 20% of polyethylene and was not wetted by water. Untreated cellulose acetate, by contrast, is readily wetted by water.

Example 4

Twenty-five grams of Solka Floc (ground purified sulfite paper pulp) were dispersed in 450 cc. of benzene under dry conditions. The air in the vessel was replaced with nitrogen and .0054 mol of $TiCl_4$ in 50 cc. of dry benzene was added to the dispersion. The mixture was allowed to react ½ hour at room temperature to bring about titanation of the floc, after which .0054 mol of triethyl aluminum in heptane was added and then 50 gms. of isoprene. Polymerization began spontaneously as indicated by a temperature rise from 26° C. to 37° C. in ½ hour. When the temperature had fallen one degree to 36° C. in forty additional minutes, gentle heat was applied to bring the mixture temperature to 74° C. at the end of one and one-half hours. The temperature of 74° C. was maintained for a period of one hour.

The catalyst was arrested or decomposed by the addition of 25 ml. of methanol. The solids were recovered by centrifuging, washing twice with benzene by filtration and drying. The solids, after drying, were a powdery cellulose-polyisoprene composition according to this invention, containing approximately 13% by weight of polyisoprene.

In addition to the polymer formed on the cellulose, a quantity of polymer remained in solution. This dissolved polyisoprene was recovered by methanol precipitation and was recovered as 34 grams of polyisoprene in powder form.

Example 5

A 3000 ml. reaction flask was flushed with nitrogen and charged under agitation with 1800 ml. of toluene, 50 g. of dry cellulose floc, 20 millimols of titanium tetrachloride, and after 5 min. with 20 millimols of triethylaluminum. Ethylene gas was passed into the reaction mixture and the temperature was raised to 65° C. The ethylene was introduced as fast as it was used up until after 3 hours 150 g. of ethylene had been polymerized on the cellulose. The product was filtered, washed with methanol, and dried to give 200 g. of a fluffy, white polyethylene-cellulose composition containing 75% by weight polyethylene.

Example 6

Example 5 was repeated except that the flask was charged with 1800 ml. of toluene, 100 g. of dry cellulose floc, 10 millimols of triethylaluminum, and after 5 min. with 10 millimols of titanium tetrachloride. After 2 hours of polymerization the yield was 200 g. of polyethylene-cellulose containing 50% by weight polyethylene.

Example 7

Example 5 was repeated except that the flask was charged with 1800 ml. of toluene, 120 g. of dry cellulose floc, 8 millimols of titanium tetrachloride, and after 5 min. with 8 millimols of triethylaluminum. After 1 hour of polymerization the yield was 128 g. of polyethylene-cellulose containing 6.3% by weight polyethylene. The product was placed in concentrated sulfuric acid to decompose the cellulose. After filtration and washing with water there remained 8 g. of polyethylene in the form of thin, hollow tubes.

*Example 8*

Example 5 was repeated except that the flask was charged with 1800 ml. of toluene, 100 g. of dry cellulose floc, 18 millimols of titanium tetrachloride, and after 5 min. with 10 millimols of triethylaluminum. After 2 hours of polymerization the yield was 200 g. of polyethylene-cellulose containing 50% by weight polyethylene. The molecular weight of this polyethylene was much lower than in Example 5 as shown by an intrinsic viscosity of 0.8 versus 5.5 for Example 5.

*Example 9*

Seventy-five grams cellulose were slurried in 1800 cc. of toluene and azeotroped to dryness. Under inert conditions .02 mol $TiCl_4$ and .02 mol triethylaluminum were added simultaneously to the cellulose slurry at 35° C. Ethylene gas was then passed into the slurry. Absorption of ethylene immediately occurred and polymerization was continued at 60–65° C. In 2¾ hours a coated cellulose composition with 59% polymer formed. Microscopic examination exhibited coated cellulose fibers, some free polyethylene and some uncoated fibers.

*Example 10*

Seventy-five grams long fiber cellulose (average length 3000 microns) were slurried in 3600 cc. toluene and azeotroped to dryness. Titanium tetrachloride (.02 mol) was diluted in 50 ml. dry heptane and allowed to react with the cellulose for 5 minutes at 35° C. with slow agitation. A 25% solution of triethylaluminum in heptane containing .02 mol of the catalyst was then added. Ethylene gas was then passed through the slurry and polymerization with ethylene was started at 45° C. at a slow rate of absorption. Agitation was speeded after 20% polymer formed. Polymerization was continued at 60–65° C. and in 3 hours a well-coated cellulose composition with 57% polymer formed. The average fiber length after reaction was 2500 microns. The product was dispersed in water and cast on a hand paper making machine into a sheet possessing good wet strength. The sheet was fused at about 150° C. into a strong water-repellent paper.

*Example 11*

The procedure of Example 1 was repeated except that, instead of ground wood cellulose, a light cotton yarn was treated. The treated yarn was substantially encased in a sleeve of polyethylene and had an appearance similar to that of untreated yarn. The yarn could be woven into a fabric for use as a water-repellent and acid-resistant cloth.

*Example 12*

Seventy grams of cotton linters were slurried in 1400 cc. toluene and azeotroped to dryness. Titanium tetrachloride (.0158 mol) was allowed to react with the cellulose for ½ hour at room temperature and then treated with .0158 mol triethylaluminum. Ethylene gas was immediately introduced and the temperature raised to 50° C. while polymerization progressed. After 3½ hours the polymerization was still very active but was interrupted by killing the catalyst with alcohol. A polymer composition containing 56.3% polyethylene was formed, in which the cotton fibers were encased in sleeves of polyethylene.

*Example 13*

Newsprint and scrap newspaper were dispersed and polymerized in a manner similar to Example 5. A dispersion of 75 grams paper in 2800 cc. toluene reacted with a .02 mol $TiCl_4$ and .02 mol triethylaluminum gave a polymer composition contaning 41% polyethylene after polymerization.

*Example 14*

A 3000 ml. reaction flask was flushed with nitrogen and charged under agitation with 1800 ml. of toluene, 50 g. of dry cellulose floc, and 40 millimols of zirconium tetrachloride. The mixture was saturated with ethylene and charged after 20 min. with 90 millimols of methylmagnesium bromide. The temperature was raised to 50° C. and ethylene was passed into the slurry for 3 hours. The product was filtered, washed with methanol, and dried. The yield was 100 g. of polyethylene-cellulose containing 50% by weight polyethylene. The molecular weight of this polyethylene was much higher than in Example 5 as shown by an intrinsic viscosity of 10.0 versus 5.5 for Example 5.

*Example 15*

A 2000 ml. reaction flask was flushed with nitrogen and charged under agitation with 1500 ml. of toluene, 40 g. of dry wood cellulose fiber, and 20 millimols of vanadium trichloride and heated to boiling. After cooling to room temperature the slurry was saturated with ethylene and charged with 10 millimols of triethylaluminum. After 1 hour of ethylene introduction the rate of absorption had fallen to zero. Addition of another 10 millimols of triethylaluminum revived the reaction which was continued for an additional 3 hours at 57° C. The product was filtered, washed several times with methanol, and dried to give 101 g. of polyethylene-cellulose containing 60.5% by weight polyethylene.

*Example 16*

A 2000 ml. reaction flask was flushed with a nitrogen and charged under agitation with 1000 ml. of toluene, 40 g. of dry wood cellulose, and 20 millimols of finely divided chromium trichloride. The mixture was agitated at 80° C. for 3 hours. 40 millimols of triethylaluminum was then added and the mixture allowed to stand 18 hours at room temperature. Ethylene was introduced and polymerized by adding three 20 millimol increments of triethylaluminum over a period of 3 hours. The yield was 44 g. of polyethylene-cellulose containing 9.1% by weight polyethylene.

*Example 17*

Dibutoxy titanium dichloride solution was prepared by mixing 10 millimols of butyl titanate and 10 millimols of titanium tetrachloride in 24 ml. of toluene and allowing to stand for 18 hours.

A 2000 ml. reaction flask was flushed with nitrogen and charged under agitation with 1000 ml. of toluene, 40 g. of dry wood cellulose, and the above dibutoxy titanium dichloride solution. After 45 min. agitation, the mixture was saturated with ethylene and charged with 40 millimols of triethylaluminum. Ethylene was introduced as fast as it was used up for 3 hours during which time the temperature had reached 52° C. The product was filtered, washed with methanol, and dried to give 64 g. of polyethylene-cellulose containing 37.5% by weight polyethylene.

*Example 18*

One-hundredth mol butyl titanate (3.4 g.) and 0.03 mol phenyllithium (2.5 g.) were added to a moisture free slurry of 37.5 g. cellulose fiber in 900 ml. toluene contained in an autoclave under nitrogen atmosphere. Polymerization was carried out for 68 hours under maximum conditions of 66° C. and 500 p.s.i. Recovery by methanol washing gave 42.3 g. of product. Microscopic examination showed the fibers to be encased in sleeves of polyethylene.

*Example 19*

In a 3 liter, 3 neck flask there was placed 40 g. of cellulose and 1500 ml. of toluene. The mixture was refluxed for several hours and 100 ml. of a water-toluene mixture was distilled out. After cooling, 0.02 mol (3.76 g.) of $TiCl_4$ was added at room temperature and stirred for five minutes following which 0.049 mol (3.16 g.) of n-butyl lithium was added to the flask in the nitrogen atmosphere in the form of a 23.4% solution in heptane.

The reaction mixture turned black and the temperature rose to 31° C.

Ethylene was passed into the liquid in the flask maintained at 65–67° C. for ½ hour when an additional 0.028 mols (1.40 g.) of n-butyl lithium was added. Stirring and heating at 65–69° C. was maintained for another four hours while ethylene was passed into the reaction mixture at an average rate of 100 ml./min. At the end of this time the product was filtered, washed with methanol and filtered again. It was then washed with a mixture consisting of 1500 ml. of $CH_3OH$, 100 ml. of water and 3 ml. of HCl. The product was filtered and dried. It weighed 61 g. and contained 34.3% polyethylene coated upon the cellulose fibers.

*Example 20*

In a 3 liter 3 neck flask there was placed 30 g. of cellulose and 1200 ml. of n-heptane. The mixture was refluxed for several hours and 100 ml. of a water-heptane mixture were distilled out. After cooling to room temperature 0.02 mols (3.76 g.) of $TiCl_4$ was added, the temperature raised to 37° C. and stirred for 20 minutes. Then 0.05 mol (4.7 g.) of isoamyl sodium suspended in n-heptane was added to the flask in a nitrogen atmosphere, the mixture turned black and the temperature rose to 40° C.

Ethylene was passed into the liquid in the flask maintained at 69–71° C. for 40 minutes when an additional 0.015 mol (1.4 g.) of isoamyl sodium was added. Stirring and heating at 69–75° C. was maintained for another 3½ hours while ethylene was passed in at a rate of 63–140 ml./min. At the end of the specified time, the reaction was cooled, the product filtered and washed with methanol, filtered and dried. It weighed 36.5 g. and contained 17.8% polyethylene coated upon the cellulose fibers.

*Example 21*

In a 3 liter 3 neck flask there was placed 30 g. of cellulose together with 1200 ml. of n-heptane. The mixture was refluxed for several hours and 110 ml. of a heptane-water mixture were distilled out. The cellulose-heptane mixture was cooled and transferred to a 3800 ml. stirring autoclave. The autoclave was sealed, flushed free of air with pure ethylene and 0.02 mol (3.76 g.) of $TiCl_4$ added to the mixture at room temperature. Stirring was maintained for ½ hour, the temperature raised at 40° C. and 0.05 mol (3.45 g.) of ethyl potassium suspended in n-heptane was added. The autoclave was pressurized to 700 p.s.i. with ethylene and the temperature was then raised to and maintained between 74–76° C. Stirring and heating was continued for an additional 3½ hours and ethylene occasionally injected to maintain the pressure at 700 p.s.i. At the end of the time period the autoclave was cooled, opened and the cellulose product removed. It was filtered, soaked in methanol, filtered and washed again in a mixture of methanol water and hydrochloric acid. The product was then filtered and dried. It weighed 48 g. containing 35.5% polyethylene coated upon the fibers.

*Example 22*

In a 3 liter 3 neck flask there was placed 10 g. of cellulose together with 1200 ml. of n-heptane. The mixture was refluxed for several hours and 95 ml. of a water-heptane mixture were distilled out. The cellulose-heptane mixture was cooled and transferred to a 3800 ml. stirring autoclave. The autoclave was sealed, flushed with nitrogen and 0.021 mol (3.27 g.) of vanadium trichloride, which had previously been finely grounded under heptane, was added in the form of a heptane slurry to the autoclave contents. The temperature was raised from 25° C. to 40° C. while stirring and 0.168 mol (3.05 g.) of tri-n-butyl boron dissolved in heptane was injected into the autoclave. The autoclave was pressurized to 1000 p.s.i. with ethylene, the temperature raised and maintained at 96–100° C. Stirring and heating was continued for an additional 4 hours with frequent ethylene injections to maintain the pressure at 1000 p.s.i. At the end of the time period, the autoclave was cooled, opened and the contents filtered. The cellulose product was soaked in methanol, filtered and then washed in a mixture of methanol, water and hydrochloric acid. It was filtered and dried. The product consisted of polyethylene coated upon the cellulose fibers.

*Example 23*

One and one-tenth ml. $TiCl_4$ (.01 mol) was added to a moisture-free slurry of 37.5 g. wood cellulose in 900 ml. toluene. After reacting for 10 minutes, .01 mol $Zn(C_2H_5)_2$ in heptane was added, the slurry turning a brown color. Ethylene was passed through the slurry. When absorption had slowed down (½ hr.), a second charge of .01 mol $Zn(C_2H_5)_2$ was added causing an increase in the absorption rate. A third .01 mol addition revived the absorption rate only slightly. Recovery of product by methanol washing gave 41 grams of hydrophobic polyethylene coated fibers.

*Example 24*

One-hundredth mol $TiCl_4$ was added to a moisture-free slurry of 37.5 gm. cellulose fibers in 900 ml. dry toluene. After 10 minutes contact time, .01 mol $Cd(C_2H_5)_2$ in heptane was added. This caused the color to change from yellow to dark brown. Gentle heating and passage of ethylene through the mixture was started and an absorption of monomer of about 1000 ml. was noted in 20 minutes. At this point (50° C.) the second .01 mol of Cd compound was added. Ethylene was continually passed through the slurry for 5½ hours while maintaining a temperature between 60 and 65° C. The slurry became black during this period. Recovery of product by methanol, dil. HCl, and water washing gave 39 grams of hydrophobic polyethylene coated fibers.

*Example 25*

A 3800 ml. autoclave was flushed with nitrogen and charged with 1000 ml. of benzene, 50 g. of dry wood cellulose, and 16 millimols of titanium tetrachloride. The mixture was agitated for 15 min. when 54 millimols of triisobutylaluminum were added. The autoclave was pressurized with propylene to 100 p.s.i.g. After a drop in pressure to 50 p.s.i.g. the autoclave was again pressurized to 100 p.s.i.g. and allowed to stand for 16 hours during which time the pressure again fell to 50 p.s.i.g. The reaction was run in the range between room temperature and 43° C., for the most part being carried out at room temperature without application of external heat, external heat to raise the temperature to 43° C. being applied at one point to speed up the reaction. The solids in the viscous reaction mixture were separated by dilution with toluene and centrifuging, followed by washing with methanol and drying. The yield was 78 g. of polypropylene-cellulose. Microscopic examination showed the fiber to be unagglomerated and individually coated with sheaths of polypropylene. The toluene solution gave by methanol precipitation 43.7 g. of gummy, low molecular weight polypropylene.

*Example 26*

Figure 3:
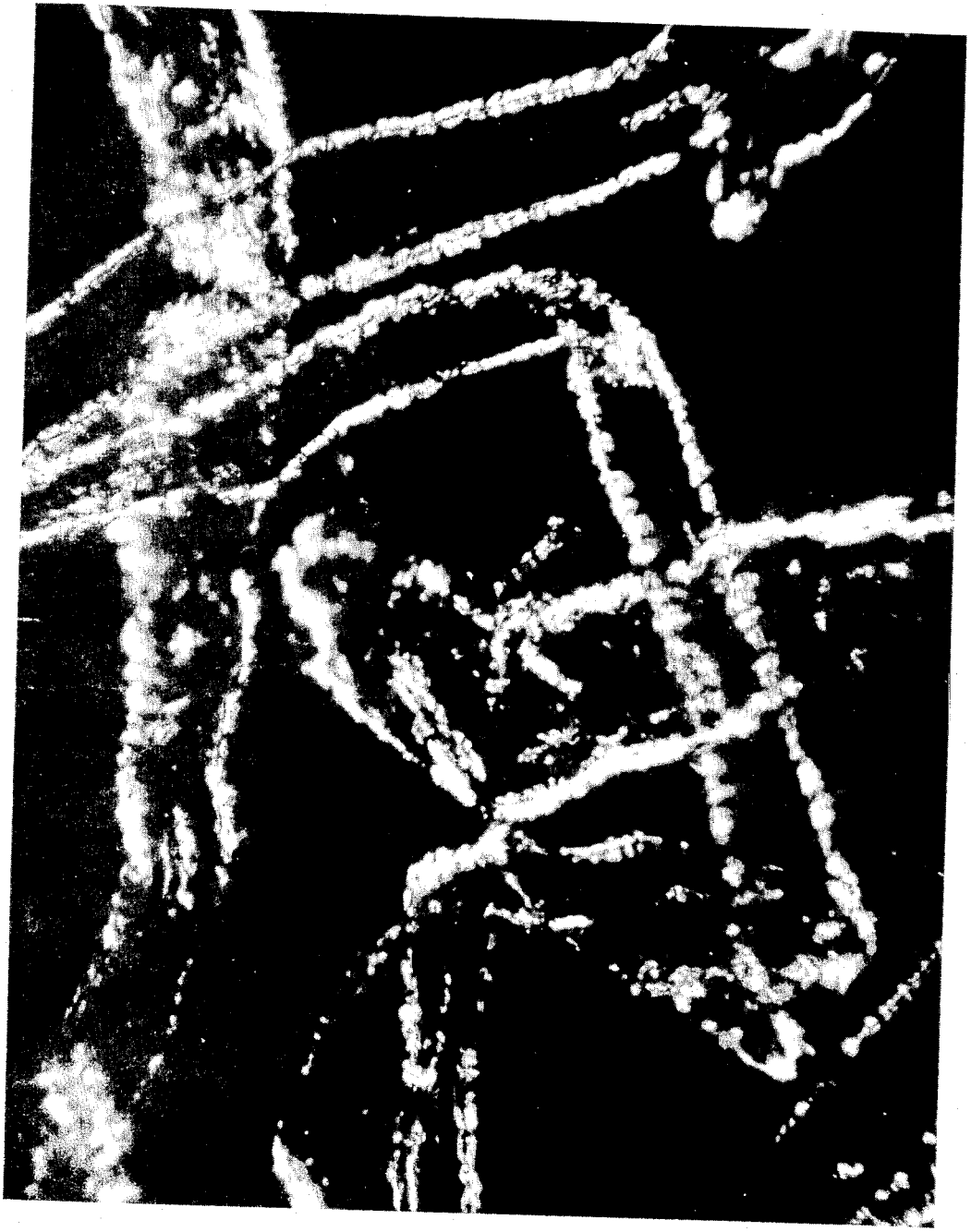
FIG. 3 is a representation of a photomicrograph at a magnification of about 750 diameters under polarized light of the polyethylene tubes or sleeves which remain after the product in FIG. 2 has been treated with strong sulfuric acid (a 70% solution) to dissolve out the cellulose or paper pulp cores.

100 grams of a polyethylene-cellulose product having approximately 67% polymer content was treated with 1 liter of concentrated sulfuric acid (sp. gr. 1.84) for 3 days to give a brown-black slurry. Recovery of inert polymeric material by water washing till free of acid and drying gave 55 gm. of light colored residue. The standard anthrone test for cellulose was negative. Microscopic examination of the cellulose free polyethylene showed it to have retained its fibrous shape and that when wetted with a drop of toluene, the solvent could be seen displacing the air entrapped in the hollow tubes left by the cellulose. Under polarized light, the fibers in the untreated polyethylene-cellulose product were seen for their entire width as light against the black background. On the other hand, the cellulose-free polymer shells after treatment showed up only as outlined, the centers being black as in FIG. 3.

*Example 27*

100 grams of a polypropylene-cellulose product having a 74% polymer content was treated with concentrated sulfuric acid as in Example 26. The unaffected polymer residue weighed 76.4% of the original weight.

*Example 28*

200 grams of the same polyethylene-cellulose product used as a starting material in Example 26 was wetted with methanol and then extracted with cuprammonium solution by passing approximately 70 liters of cellulose solvent through the product held on a fritted glass filter plate. The residue was washed with water, dilute hydrochloric acid, and more water. The cuprammonium solution used in this extraction was prepared from 22.4% anhydrous cupric hydroxide dissolved in 92% of concentrated ammonia solution diluted with 8% of water. The product was same as produced in Example 26.

*Example 29*

One hundred grams of the polyethylene-cellulose product used as a starting material in Example 26 was treated according to the "Viscose" process. Thus, the sample was thoroughly mixed with 2 liters of 18% sodium hydroxide solution and let stand for 5 hours. After filtering, the damp cake was broken up and tumbled overnight in a closed container. The resulting soda-cellulose was tumbled for 3½ hours with 32 ml. carbon disulfide to convert it to cellulose xanthate. Excess carbon disulfide was allowed to evaporate and the orange-yellow cellulose salt was extracted with three 900-ml. portions of 3% sodium hydroxide solution. The solids remaining were thoroughly washed with water and dried. A qualitative anthrone test for cellulose on the white residue was weakly positive. The same hollow shells of polymer were obtained in this case as were obtained in Example 26.

*Example 30*

Ten grams of cellulose were dried by azeotroping with 400 ml. of heptane. After cooling, 0.025 mols of $TiCl_4$ dissolved in 35 ml. of heptane were added under nitrogen followed in fifteen minutes by 0.122 mol of triethylaluminum. The temperature was then raised to 51° C. and 1-butene was added at a rate of 685 ml./min. The reaction was maintained with stirring at a temperature of 62° to 75° C. for one hour and forty-five minutes. The resulting solids were washed several times with heptane followed by three washings with excess methanol and was then filtered and dried.

The product was a powder weighing 20 grams and contained cellulose fibers encased in sleeves of poly-1-butene.

*Example 31*

Two blocks of total weight 12.64 grams and approximately 1¼" x 1" x 4" in size were cut from a larger block which was molded at 150° C. without pressure from a polyethylene-cellulose product having a 54.2% polyethylene content. The porosity or percentage of voids in the block was 94%. After being dampened with methanol, they were submerged for 18 hours in 70% sulfuric acid slowly circulated by a stream of nitrogen. Washing with fresh 70% acid and then with water was not a problem for it was found that the liquids flowed readily through the blocks when poured on the surface. The weight of the dry extracted blocks was 7.01 grams or 55.5% of the original. Cellulose extraction has given a softer feeling, lighter colored block which is less than a ⅛ inch shorter on the 4 inch dimension. The original density of 5.1 lbs. per cu. ft. had been reduced to 2.8 and the porosity had been increased from 94% to 95.5%.

*Example 32*

One hundred and ten gram samples of polyethylene-cellulose powder having a 50% polyethylene and 50% cellulose content and produced in accordance with the invention were poured into a 3" x 4" mold and formed under varying pressures at room temperature into samples. A comparison of these samples is as follows:

| Molding Pressure p.s.i. | Sample Thickness inches | Density Pounds/ cu. ft. | Porosity or percent voids |
|---|---|---|---|
| 16 | 3.0 | 11.64 | 85.2 |
| 31 | 2.71 | 12.88 | 83.6 |
| 63 | 2.15 | 16.24 | 79.4 |
| 125 | 1.68 | 20.78 | 73.6 |
| 250 | 1.22 | 28.62 | 63.6 |
| 500 | 1.10 | 31.74 | 59.8 |
| 750 | 0.97 | 36.00 | 54.2 |

Two additional samples were formed from the same material and in the same 3" x 4" molds but molding was accomplished with both heat and pressure. A comparison of these samples is as follows:

| Molding Temperature, °F. | Molding Pressure | Sample Thickness | Density | Porosity |
|---|---|---|---|---|
| 210 | 20.8 | 1.71 | 20.37 | 74.1 |
| 250 | 41.7 | 1.50 | 23.28 | 70.4 |

*Example 33*

Polyethylene-cellulose particles having a 50% polyethylene and 50% cellulose content and produced in accordance with the invention were slurried and formed into 11½ in. x 11½ in. sheets on the screen of a hand paper machine. Each sheet thus formed was 0.120 in. thick. Both single sheets and laminated sheets were placed in a press in which the edges of the sheets were unrestrained and pressed at 310° F. The results were as follows:

| Weight per sheet, gr. | Number of sheets | Thickness before pressing, in. | Pressing pressure, p.s.i. | Thickness after pressing, in. |
|---|---|---|---|---|
| 30 | 1 | 0.120 | 4.5 | 0.035 |
| 60 | 1 | 0.240 | 4.5 | 0.072 |
| 30 | ¹5 | 0.60 | 4.5 | 0.155 |
| 30 | ¹10 | 1.20 | 4.5 | 0.31 |
| 30 | 1 | 0.120 | 510 | 0.012 |

¹ Laminated.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A composition which comprises discrete pieces capable of being bonded together by heat and pressure into articles having various shapes and degrees of porosity, each of said pieces having a core composed of a solid cellulosic material and a shell composed of a polymer of an aliphatic 1-olefin monomer containing less than 6 carbon atoms, said polymer shell conforming to the shape of said core and substantially completely surrounding the core, said core and shell being visibly distinguishable from each other, and said polymer shell being separable from said core.

2. A composition of discrete particles, each of said discrete particles consisting essentially of a core of solid cellulosic material individually substantially encased in a shell of polymerized aliphatic 1-olefin monomer containing less than 6 carbon atoms, said shell conforming substantially to the shape of said cellulosic core and being visibly distinguishable and chemically separable therefrom.

3. A free-flowing mixture of cellulose fibers each of which is substantially encased in a distinctly separate shell of polymerized aliphatic 1-olefin monomer containing less than 6 carbon atoms, said polymer shell being separable from said cellulose fibers by chemical means.

4. A mixture as defined in claim 3 in which the polymer shell is polyethylene.

5. A mixture as defined in claim 3 in which the polymer shell is polypropylene.

6. A process for treating particles, fibers or filaments of cellulosic material in their solid state to form shells of polymer thereon which comprises treating said material with one component of a two-component organometallic-transition metal catalyst system the components of which consist essentially of transition metal compounds and organometallic reagents which, upon reaction with each other, form an initiator effective at low pressure for polymerizing 1-olefins, said treatment with said one component being in the proportion of from about 0.066 to 2.5 millimoles of said one component per gram of said cellulosic material, forming on said material active sites of polymerization initiator by reacting the treated cellulosic material with the remaining component of the catalyst system before said components have had an opportunity to react substantially with each other, and polymerizing an aliphatic 1-olefin containing less than 6 carbon atoms on said material by bringing the catalyst treated material with said active sites into contact with said 1-olefin to form separate shells of polymer on said particles, fibers or filaments of the solid cellulosic material.

7. A process for treating particles, fibers or filaments of cellulosic material in their solid state to form shells of polymer thereon which comprises treating said material with one component of a two-component organometallic-catalyst system the components of which consist essentially of a transition metal compound selected from the group consisting of halides and esters of titanium, zirconium, vanadium and chromium, and a reagent selected from the group consisting of alkyl and aryl compounds of one of the metals lithium, sodium, potassium, magnesium, calcium, zinc, cadmium, boron and aluminum, and which, upon reaction with each other, form an initiator effective at low pressures for polymerizing 1-olefins, said treatment with said one component being in the proportion of from about 0.066 to 2.5 millimoles of said one component per gram of said cellulosic material, forming on said material active sites of polymerization initiator by reacting the treated cellulosic material with the remaining component of the catalyst system before said components have had an opportunity to react substantially with each other, and polymerizing an aliphatic 1-olefin containing less than 6 carbon atoms on said material by bringing the catalyst treated material with said active sites into contact with said 1-olefin to form separate shells of polymer on said particles, fibers or filaments of the solid cellulosic material.

8. In a process as recited in claim 7 in which the catalyst treated cellulosic material with said active sites of polymerization initiator formed thereon is brought into contact with said 1-olefin while said catalyst treated cellulosic material is in suspension in a reaction vessel in an inert organic liquid.

9. In a process as recited in claim 7 in which said cellulosic material is first treated with said reagent and is, thereafter, reacted with said transition metal compound.

10. In a process as recited in claim 7 in which said aliphatic 1-olefin is ethylene and said catalyst system comprises a halide of titanium and a metal alkyl selected from the group of metals consisting of lithium, sodium, potassium, magnesium, calcium, zinc, cadmium, boron, and aluminum.

11. A process as recited in claim 7 in which said aliphatic 1-olefin is propylene and said catalyst system comprises a halide of titanium and a metal alkyl selected from the group of metals consisting of lithium, sodium, potassium, magnesium, calcium, zinc, cadmium, boron, and aluminum.

12. A process as recited in claim 7 in which at least a major portion of said 1-olefin is ethylene.

13. A process as recited in claim 7 in which at least a major portion of said 1-olefin is propylene.

14. A process as recited in claim 7 in which at least a major portion of said 1-olefin is isoprene.

15. A process as recited in claim 7 in which said cellulosic material is first treated with said transition metal compound and, thereafter, reacted with said reagent.

16. A process for forming polyolefin-cellulosic articles which comprises treating solid particles of cellulosic material with one component of a two-component organometallic-transition metal catalyst system the components of which consist essentially of transition metal compounds and organometallic reagents which, upon reaction with each other, form an initiator effective at low pressures for polymerizing 1-olefins, said treatment with said one component being in the proportion of from about 0.066 to 2.5 millimoles of said one component per gram of said cellulosic material, forming active sites of polymerization initiator on said particles by reacting the treated cellulosic particles with the remaining component of the catalyst system and polymerizing an aliphatic 1-olefin containing less than 6 carbon atoms on the surface of said solid particles by bringing the catalyst treated particles into contact with said 1-olefin to form shells of polymer on said particles and, thereafter, forming the treated particles into a self-sustained article.

17. A process for forming polyolefin-cellulosic articles which comprises treating solid particles of cellulosic material with one component of a two-component catalyst system the components of which consist essentially of a transition metal compound selected from the group consisting of halides and esters of titanium, zirconium, vanadium and chromium, and a reagent selected from the group consisting of alkyl and aryl compounds of one of the metals lithium, sodium, potassium, magnesium, calcium, zinc, cadmium, boron, and aluminum, and which, upon reaction with each other, form an initiator effective at low pressures for polymerizing 1-olefins, said treatment with said one component being in the proportion of from about 0.066 to 2.5 millimoles of said one component per gram of said cellulosic material, forming active sites of polymerization initiator on said particles by reacting the treated cellulosic particles with the remaining component of the catalyst system and polymerizing an aliphatic 1-olefin containing less than 6 carbon atoms on the surface of said solid particles by bringing the catalyst treated particles into contact with said 1-olefin to form shells of polymer on said particles and, thereafter, forming the treated particles into a self-sustained article.

18. In a process as recited in claim 17 in which said forming is accomplished essentially by pressure.

19. In a process as recited in claim 17 in which said forming is accomplished essentially by heat.

20. In a process as recited in claim 17 in which said forming is accomplished essentially by heat and pressure.

21. In a process as recited in claim 17 in which said forming consists essentially in treating said polyolefin-cellulosic particles with a volatile solvent.

22. A process for forming a porous product which comprises treating solid particles of cellulosic material with one component of a two-component organometallic-transition metal catalyst system the components of which consist essentially of transition metal compounds and organometallic reagents which, upon reaction with each other, form a polymerized initiator for 1-olefins, said treatment with said one component being in the proportion of from about 0.066 to 2.5 millimoles of said one component per gram of said cellulosic material, reacting the treated cellulosic particles with the remaining component of the catalyst system to form active catalyst sites thereon and polymerizing a 1-olefin on said solid particles by bringing the catalyst treated particles into contact with said 1-olefin to polymerize a shell of polymer on each of said particles and treating said particles to dissolve and remove said cellulosic material from said shell of polymer.

23. A process for forming a porous product which comprises treating solid particles of cellulosic material with one component of a two-component organometallic catalyst system the components of which consist essentially of a transition metal compound selected from the group consisting of halides and esters of titanium, zirconium, vanadium and chromium, and a reagent selected from the group consisting of alkyl and aryl compounds of one of the metals lithium, sodium, potassium, magnesium, calcium, zinc, cadmium, boron and aluminum, and which, upon reaction with each other, form a polymerized initiator for 1-olefins, said treatment with said one component being in the proportion of from about 0.066 to 2.5 millimoles of said one component per gram of said cellulosic material, reacting the treated cellulosic particles with the remaining component of the catalyst system to form active catalyst sites thereon and polymerizing a 1-olefin on said solid particles by bringing the catalyst treated particles into contact with said 1-olefin to polymerize a shell of polymer on each of said particles and treating said particles to dissolve and remove said cellulosic material from said shell of polymer.

24. In a process as recited in claim 23 in which said particles having a shell of polymer formed thereon are first treated with sodium hydroxide solution and thereafter treated with carbon disulfide followed by a second treatment of sodium hydroxide solution to dissolve and remove said cellulosic material.

25. A process for forming a porous product which comprises treating solid particles of cellulosic material with one component of a two-component organometallic-transition metal catalyst system, the components of which consist essentially of transition metal compounds and organometallic reagents which, upon reaction with each other, form a polymerization initiator for 1-olefins, said treatment with said one component being in the proportion of from about 0.066 to 2.5 millimoles of said one component per gram of said cellulosic material, reacting the treated cellulosic particles with the remaining component of the catalyst system to form active catalyst sites thereon and polymerizing a 1-olefin on said solid particles by bringing the catalyst treated particles into contact with said 1-olefin to polymerize a shell of polymer on each of said particles, forming said particles with said shells of polymer thereon into a self-sustaining article, and, thereafter, treating said particles in said self-sustaining article to dissolve said cellulosic material and to remove said cellulosic material from said article.

26. A process for forming a porous product which comprises treating solid particles of cellulosic material with one component of a two-component organometallic catalyst system, the components of which consist essentially of a transition metal compound selected from the group consisting of the halides and esters of titanium, zirconium, vanadium and chromuim, and a reagent selected from the group consisting of alkyl and aryl compounds of one of the metals lithium, sodium, potassium, magnesium, calcium, zinc, cadmium, boron and aluminum, and which, upon reaction with each other, form a polymerization initiator for 1-olefins, said treatment with said one component being in the proportion of from about 0.066 to 2.5 millimoles of said one component per gram of said cellulosic material, reacting the treated cellulosic particles with the remaining component of the catalyst system to form active catalyst sites thereon and polymerizing a 1-olefin on said solid particles by bringing the catalyst treated particles into contact with said 1-olefin to polymerize a shell of polymer on each of said particles, forming said particles with said shells of polymer thereon into a self-sustaining article and, thereafter, treating said particles in said self-sustaining article to dissolve said cellulosic material and to remove said cellulosic material from said article.

27. In a process as recited in claim 26 in which said self-sustained article is treated with sulfuric acid to remove said cellulosic material from said shells of polymer.

28. In a process as recited in claim 26 in which said self-sustained article is treated with cuprammonium hydroxide to remove said cellulosic material from said shells of polymer.

29. A free-flowing moldable composition of discrete, irregular shaped, hollow particles, said hollow particles being formed by dissolving and removing the core of cellulosic material from a free-flowing powder of cellulosic fibers each fiber of which is substantially encased in a shell of a polymerized aliphatic 1-olefin monomer containing less than 6 carbon atoms, said hollow particles each consisting essentially of a self-sustaining hollow shell of said polymerized monomer, said hollow particles having a dimension in one direction substantially greater than the dimension in the other direction.

30. A molded polyolefinic product consisting essentially of irregularly shaped, hollow shells of a polymer of aliphatic 1-olefin monomer containing less than 6 carbon atoms, said hollow shells being formed by dissolving and removing the core of cellulosic material from a body of cellulosic fibers each fiber of which is substantially encased in a shell of polymerized aliphatic 1-olefin monomer containing less than 6 carbon atoms, said hollow shells being joined each to the other, said shells having a dimension in one direction substantially greater than the dimension in the other direction.

31. A molded article consisting essentially of individual particles of solid cellulosic material, each of said individual particles being substantially encased in a shell of polymerized aliphatic 1-olefin monomer containing less than 6 carbon atoms, said particles of solid cellulosic material being separated from each other by said shell of polymerized aliphatic 1-olefin monomer, said shells on adjacent particles being joined to each other.

References Cited in the file of this patent

UNITED STATES PATENTS

| | | |
|---|---|---|
| 2,542,771 | Hanford et al. | Feb. 20, 1951 |
| 2,797,201 | Veatch et al. | June 25, 1957 |
| 2,904,840 | Hochreuter | Sept. 22, 1959 |
| 2,932,079 | Dietzsch et al. | Apr. 12, 1960 |

FOREIGN PATENTS

| | | |
|---|---|---|
| 533,362 | Belgium | May 16, 1955 |
| 552,348 | Canada | Jan. 28, 1958 |
| 576,659 | Great Britain | Apr. 15, 1946 |

Notice of Adverse Decision in Interference

In Interference No. 96,369 involving Patent No. 3,121,698, J. A. Orsino, D. F. Herman and J. J. Brancato, PROCESS OF COATING CELLULOSIC PARTICLES BY POLYMERIZING A 1-OLEFIN ONTO SAID PARTICLES; PROCESS OF REMOVING THE CELLULOSIC PARTICLES FROM THE COATED PARTICLES AND HOLLOW SHELLS OBTAINED THEREFROM, final judgment adverse to the patentees was rendered July 30, 1971, as to claims 4 and 5.

[*Official Gazette December 21, 1971.*]